United States Patent [19]

Okada et al.

[11] Patent Number: 4,682,519

[45] Date of Patent: Jul. 28, 1987

[54] HYDRAULIC FLUID PRESSURE CONTROL DEVICE FOR A CONTINUOUSLY VARIABLE AUTOMOBILE TRANSMISSION PROVIDING A QUICK SPEED CHANGE RATIO INCREASE

[75] Inventors: Mitsuhiko Okada; Hiroshi Ito, both of Toyota, Japan

[73] Assignee: Toyota Jidosha Kabushiki Kaisha, Toyota, Japan

[21] Appl. No.: 669,885

[22] Filed: Nov. 9, 1984

[30] Foreign Application Priority Data

Nov. 11, 1983 [JP] Japan ................. 58-210993

[51] Int. Cl.4 .................................. F16H 55/56
[52] U.S. Cl. .......................... 74/868; 74/867
[58] Field of Search .............. 74/867, 868, 865; 474/11, 12, 17, 18, 28

[56] References Cited

U.S. PATENT DOCUMENTS

| | | | |
|---|---|---|---|
| 4,161,894 | 7/1979 | Giacosa ................................ | 474/28 |
| 4,462,277 | 7/1984 | Miki et al. ........................... | 74/867 |
| 4,475,416 | 10/1984 | Underwood ...................... | 474/12 X |
| 4,476,746 | 10/1984 | Miki et al. ........................... | 74/867 |
| 4,512,751 | 4/1985 | Tanaka et al. ...................... | 474/28 |
| 4,522,086 | 6/1985 | Haley ................................. | 74/867 |
| 4,533,340 | 8/1985 | Abo et al. ........................... | 474/28 |
| 4,534,243 | 8/1985 | Yokoyama et al. ................. | 474/28 |
| 4,542,665 | 9/1985 | Yamamuro et al. ................. | 74/867 |
| 4,547,178 | 10/1985 | Hayakawa et al. ............... | 474/28 X |
| 4,559,850 | 12/1985 | Sakakibara ....................... | 474/12 X |

Primary Examiner—Leslie Braun
Assistant Examiner—Joseph M. Rolnicki
Attorney, Agent, or Firm—Oblon, Fisher, Spivak, McClelland & Maier

[57] ABSTRACT

A control device for a continously variable belt transmission device, including driving and driven pulley assemblies with an endless belt assembly fitted in a power transmitting manner around them in V-shaped grooves thereof to provide power transmission therebetween at a speed change ratio, the driving and driven pulley assemblies having respective first and second pressure chambers, each of which according to supply of hydraulic fluid pressure to it alters the effective pulley radius of its pulley assembly. The control device supplies a line pressure to the second pressure chamber for the driven pulley assembly, and includes: a control pressure generating valve which generates a control pressure which decreases along with increase in the speed change ratio; a line pressure generating valve, which receives supply of the control pressure from the control pressure generating valve, and which generates the line pressure and supplies it to the second pressure chamber for the driven pulley assembly, this line pressure decreasing along with increase in the control pressure generated by the control pressure generating valve; and a cutoff valve which, when a sudden increase of the speed change ratio is required, prevents transmission of the control pressure from the control pressure generating valve to the line pressure generating valve. Thereby, in these circumstances of sudden speed change ratio increase, the line presure is made to be maximum, and accordingly is well able to power the driven pulley assembly, at its pressure chamber, to quickly alter the speed change ratio.

7 Claims, 10 Drawing Figures

HYDRAULIC FLUID PRESSURE CONTROL DEVICE FOR A CONTINUOUSLY VARIABLE AUTOMOBILE TRANSMISSION PROVIDING A QUICK SPEED CHANGE RATIO INCREASE

FIELD OF THE INVENTION

BACKGROUND OF THE INVENTION

The present invention relates to a control device for a continuously variable belt transmission device which is suitable for use for coupling the power output member of an engine of a vehicle such as an automobile to the driven wheels thereof, and more particularly relates to a control device for such a continuously variable belt transmission device in which no problems arise when a quick increase in the speed change ratio is required.

DESCRIPTION OF THE PRIOR ART

The present patent application has been at least partially prepared from material which has been included in Japanese Patent Application No. Sho 58-210993 (1983), which was invented by the same inventors as the present patent application, and the present patent application hereby incorporating the text of that Japanese Patent Application and the claim or claims and the drawings thereof into this specification by reference; a copy of which is appended to this specification.

There is a known form of a continuously variable belt transmission device, which is generally structured as follows. A driving power input shaft and a driven power output shaft extend parallel to one another, with a driving pulley assembly provided on the driving shaft and a driven pulley assembly provided on the driven shaft. Each of these pulley assemblies is made up of an axially fixed pulley member and an axially movable pulley member, these two pulley members having conical faces which axially confront one another and being spaced apart by a distance which can be varied. Thus, in each of the driving and driven pulley assemblies, a V-shaped groove is defined between the two pulley members thereof, and the width of this V-shaped groove can be selectively altered. An endless belt is fitted around the two pulley assemblies, resting in their V-shaped grooves, and typically this endless belt is made up of a number of wedge shaped blocks each of which fits snugly into the V-shaped grooves, all linked together in series in a chain gang manner by one or more flexible and strong backing belts. With respect to the direction along the axes of the driving and driven shafts, in the driving pulley assembly the axial order of the axially fixed pulley member and the axially movable pulley member is opposite that in the driven pulley assembly. Such a continuously variable belt transmission device is exemplified in the Transmatic transmission of Van Doorn Ness Transmission Company of Holland, and is very useful for keeping the fuel consumption of the vehicle low while providing comfortable driving characteristics including good drivability thereof.

In such a continuously variable belt transmission device, when it is desired to vary the transmission ratio, the widths of the V-shaped grooves of the driving pulley assembly and of the driven pulley assembly are simultaneously altered, typically by the supply and/or draining of hydraulic pressures to and from pressure chambers of said driving and driven pulley assemblies, by a control system, in such a fashion that one of them is narrowed while the other is widened, so that the endless belt rides upwards away from the rotational axis of the one of the pulley assemblies while riding downwards towards the rotational axis of the other of the pulley assemblies, the while always keeping the endless belt properly taut. In more detail, from the so called unity transmission ratio position, in which the endless belt is taut and the radius of its run which is extended around the driving pulley assembly is the same as the radius of its run which is extended around the driven pulley assembly, when it is desired to decrease the speed change ratio from unity, in other words to provide a speed increasing power transmission function (the term "speed change ratio", which means the ratio of the rotational speed of the driving pulley assembly to the rotational speed of the driven pulley assembly, will be used henceforward in this specification), the movable pulley member of the driving pulley assembly is brought closer to the fixed pulley member of said driving pulley assembly, so that the radius of the run of the endless belt which extends around said driving pulley assembly increases, while at the same time the movable pulley member of the driven pulley assembly is moved further away from the fixed pulley member of said driven pulley assembly, so that the radius of the run of the endless belt which is extended around said driven pulley assembly decreases. And this is done while keeping the endless belt properly taut around the pulley assemblies, by proper synchronization. On the other hand, when it is desired to increase the speed change ratio from unity, in other words to provide a speed reducing power transmission function, the movable pulley member of the driving pulley assembly is brought further away from the fixed pulley member of said driving pulley assembly, so that the radius of the run of the endless belt extended around said driving pulley assembly decreases, while at the same time the movable pulley member of the driven pulley assembly is brought closer to the fixed pulley member of said driven pulley assembly, so that the radius of the run of the endless belt extended around said driven pulley assembly increases. Again, by proper synchronization, this is done while keeping the endless belt properly taut around the pulley assemblies.

Such a continuously variable belt transmission device can provide continuous variation of speed change ratio, and accordingly provides good and smooth power transmission for a vehicle without any speed shift jerking, but problems arise when a rapid increase of the speed change ratio is required, as follows.

Typically a so called line hydraulic pressure P1 is supplied to the pressure chamber of the driven pulley assembly for controlling the distance between its axially movable and fixed pulley members, and therefore, in order to ensure minimum power loss in the hydraulic fluid pressure pump, while at the same time providing good and reliable power transmission without slippage of the endless belt assembly on either of the driving and driven pulley assemblies, this line pressure P1 must be kept up to, but not substantially higher than, the minimum line pressure necessary. Typically therefore, since, for the same torque on the driving pulley assembly, the torque on the driven pulley assembly is proportional to the speed change ratio being provided by the continuously variable belt transmission device, a control pressure Pc related to this speed change ratio is obtained, and then this control pressure Pc is used to modify the line pressure P1, so as to obtain a line pressure P1 which increases along with an increase in the speed change ratio.

However, during actual use of such a transmission, when there is a requirement for a sudden or quick increase of speed change ratio, the system cannot provide such quick increase. Specifically, when the vehicle is being started off from a rest position, it is required that the torque supplied to the wheels thereof be at its maximum, and accordingly when the vehicle is stationary at rest the speed change ratio is required to be at its maximum. Accordingly, therefore, as the vehicle is stopping, perhaps fairly abruptly, it is necessary for the continuously variable belt transmission device to be shifted quickly and reliably toward a state in which it provides said maximum speed change ratio, quite typically from a state in which it is providing its minimum speed change ratio. Since however in this minimum speed change ratio state the line pressure P1 is low, the problem occurs that the supply of pressure for of the axially movable pulley of the driven pulley assembly is insufficient, and accordingly the speed change ratio change time is increased and the drivability of the vehicle is worsened. In order to avoid this problem, it is necessary to keep the line pressure P1 at more than the minimum value even during steady transmission operation at a low speed change ratio, in order to have a sufficient supply of line pressure in the case of rapid stopping, and this means that the endless belt assembly is kept too tight and is subjected to excessive strain, as a result of which the durability of said endless belt assembly is deteriorated.

SUMMARY OF THE INVENTION

In view of these calculations, it is the primary object of the present invention to provide a control device for a continuously variable belt transmission device, the construction of which is so improved that a quick increase of the speed change ratio provided by the continuously variable belt transmission device is available.

It is a further object of the present invention to provide such a control device for a continuously variable belt transmission device, which has a suitable line pressure always available for altering the speed change ratio provided thereby.

It is a further object of the present invention to provide such a control device for a continuously variable belt transmission device, which can always ensure satisfactory speed change ratio alteration.

It is a further object of the present invention to provide such a control device for a continuously variable belt transmission device, which reduces the likelihood of damage to the endless belt assembly caused by excessive tension caused by too high a line pressure.

It is a further object of the present invention to provide such a control device for a continuously variable belt transmission device, of which the durability is good.

It is a further object of the present invention to provide such a control device for a continuously variable belt transmission device which always provides good drivability for the vehicle to which it is fitted.

It is a further object of the present invention to provide such a control device for a continuously variable belt transmission device which allows for a swift and satisfactory increase of the speed change ratio of said transmission.

It is a further object of the present invention to provide such a control device for a continuously variable belt transmission device which allows for the resetting of the axial position of its axially movable driven pulley member to be performed in a celeritous fashion.

It is a further object of the present invention to provide such a control evice for a continuously variable belt transmission device which allows for vehicle fuel consumption to be kept at desirable levels.

It is a yet further object of the present invention to provide such a control device for a continuously variable belt transmission device which ensures good and reliable transmission of the rotational power of the engine to the driving wheels of the vehicle.

It is a yet further object of the present invention to provide such a control device for a continuously variable belt transmission device which reliably prevents slippage of the belt assembly on the driving and driven pulley assemblies.

It is a yet further object of the present invention to provide such a control device for a continuously variable belt transmission device which prevents any unnecessary power loss in the hydraulic fluid pressure pump thereof.

It is a yet further object of the present invention to provide such a control device for a continuously variable belt transmission device which reliably sets the speed change ratio at its maximum when the vehicle is stationary.

It is a yet further object of the present invention to provide such a control device for a continuously variable belt transmission device which reliably ensures that the speed change ratio is set to its maximum value when the vehicle is starting off from rest.

According to the most general aspect of the present invention, these and other objects are accomplished by a control device, for a continuously variable belt transmission device comprising a driving pulley assembly including an axially fixed pulley member and an axially movable pulley member, a driven pulley assembly including an axially fixed pulley member and an axially movable pulley member, an endless belt assembly which is fitted in a power transmitting manner around said driving pulley assembly and said driven pulley assembly in V-shaped grooves thereof to provide power transmission therebetween at a speed change ratio, and first and second pressure chambers for said driving and driven pulley assemblies respectively, each of which according to supply of hydraulic fluid pressure to it alters the axial distance between its said axially fixed and axially movable pulley members so as to alter the effective pulley radius of a respective one of said driving and driven pulley assemblies, said control device supplying a line pressure to said second pressure chamber for said driven pulley assembly, and comprising: a control pressure generating valve which generates a control pressure which decreases along an increase in said speed change ratio; a line pressure generating valve, which receives supply of said control pressure from said control pressure generating valve, and which generates said line pressure and supplies it to said second pressure chamber for said driven pulley assembly, said line pressure decreasing along with increase in said control pressure generated by said control pressure generating valve; and a cutoff valve which, when a sudden increase of said speed change ratio is required, prevents transmission of said control pressure from said control pressure generating valve to said line pressure generating valve.

According to such a structure, when said sudden increase of speed change ratio is required and said cutoff valve prevents transmission of said control pressure from said control pressure generating valve to said line pressure generating valve, this produces an effect on the line pressure generating valve akin to that when the control pressure is equal to zero, and accordingly the line pressure generating valve generates a line pressure of the maximum amount, which is very desirable for quickly increasing said speed change ratio by quickly actuating the driven pulley assembly by being supplied to its pressure chamber. Thus, the construction of this control device is so improved that quick increase of the speed change ratio provided by the continuously variable belt transmission device is available, because a suitable line pressure is always available for altering the speed change ratio provided thereby. Thus, satisfactory speed change ratio alteration is always ensured, and the likelihood of damage to the endless belt assembly caused by excessive tension caused by too high a line pressure is reduced. Thereby the durability of the continuously variable belt transmission device is good. Because the resetting of the position of the driven member of the driven pulley assembly is performed by using an adequate line pressure at all times, this control device always provides good drivability for the vehicle to which it is fitted, because it allows swift and satisfactory increase of the speed change ratio of said transmission, by allowing this resetting of the axial position of the axially movable driven pulley member to be performed in a celeritous fashion. Accordingly, this control device for a continuously variable belt transmission device allows vehicle fuel consumption to be kept good, and ensures good and reliable transmission of the rotational power of the engine to the driving wheels of the vehicle, while reliably preventing slippage of the belt assembly on the driving and driven pulley assemblies. Also, by minimizing the actual requirements for line pressure by keeping this line pressure low by the use of the line pressure generating valve when the cutoff valve is not being used, this control device prevents any unnecessary power loss in the hydraulic fluid pressure pump of the continuously variable belt transmission device. By this quick alteration of the effective radius of the driven pulley assembly, the control device for a continuously variable belt transmission device reliably sets the speed change ratio at its maximum when the vehicle is stationary, or in so called kickdown conditions, by rapidly increasing said speed change ratio as the vehicle comes to a halt, and thus reliably ensures that the speed change ratio is set to its maximum value when the vehicle is starting off from rest. On the other hand, in normal non-stopping vehicle operational conditions, the line pressure generating valve generates a line pressure which is smaller the smaller is the speed change ratio, according to the control exerted on said line pressure generating valve by the control pressure, and accordingly excessive strain on the endless belt assembly is prevented and the durability of the endless belt assembly and of the transmission as a whole is improved.

Further, according to a more particular aspect of the present invention, these and other objects are more particularly and concretely accomplished by a control device for a continously variable belt transmission device as described above, wherein said cutoff valve is an open and close valve which when closed blocks the transmission of said control pressure from said control pressure generating valve to said line pressure generating valve, so that when a sudden alteration of speed change ratio is required said cutoff valve is controlled to be closed; or, according to an alternative particular aspect of the present invention, these and other objects may alternatively be more particularly and concretely accomplished by a control device for a continously variable belt transmission device as first described above, wherein said cutoff valve is an open and close valve which when opened intercepts the transmission of said control pressure from said control pressure generating valve to said line pressure generating valve by bypassingly draining said control pressure to a drain, so that when a sudden alteration of speed change ratio is required said cutoff valve is controlled to be opened.

BRIEF DESCRIPTION OF THE DRAWINGS

The present invention will now be shown and described with reference to the preferred embodiments thereof, and with reference to the illustrative drawings. It should be clearly understood, however, that the description of the embodiments, and the drawings, are all given purely for the purposes of explanation and exemplification only, and none of them are intended to be limitative of the scope of the present invention in any way, since the scope of the present invention is to be defined solely by the legitimate and proper scope of the appended claims. In the drawings, like parts, space and related elements are denoted by like reference symbols in the various figures thereof wherein, in the description, spatial terms are to be everywhere understood in terms of the relevant figure; and:

DESCRIPTION OF THE PREFERRED EMBODIMENTS

Figure 1:
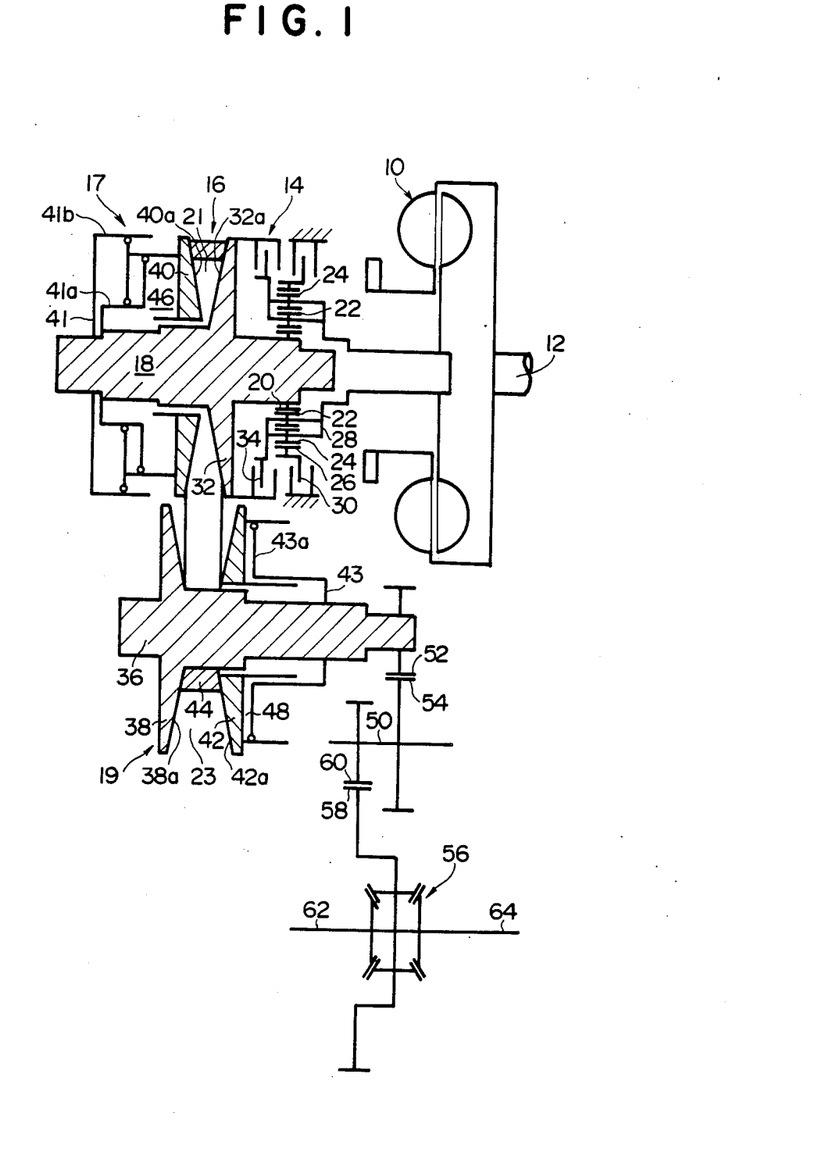
FIG. 1 is a general schematic skeleton view of a power train of a vehicle, which includes a continuously variable belt transmission device to be controlled by a hydraulic fluid pressure control device according to the present invention.

The present invention will now be described with reference to the preferred embodiments thereof, and with reference to the appended drawings. FIG. 1 is a general schematic skeleton view of a power train of a vehicle, which includes a continuously variable belt transmission device generally denoted by the reference numeral 16 which is to be controlled by a control device according to the present invention; thus this figure is relevant to all the embodiments of the present invention which will be discussed.

In this figure, 12 is a crankshaft of an engine, which is not otherwise shown, for the vehicle, and this crankshaft 12 drives a power input member of a coaxially provided fluid clutch mechanism 10 which is per se known, and which comprises a lock up clutch mechanism which is also per se known; this lock up clutch mechanism is not particularly shown in FIG. 1. The power output member of this fluid clutch 10 drives a power input member of a coaxially provided planetary gear mechanism 14, i.e. a carrier 28 of said planetary gear mechanism, which also comprises a sun gear 20 and a ring gear 26. On the carrier 28 are rotatably mounted two sets of planetary pinions: an inner set consisting of a plurality of inner planetary pinions 22 meshed at their inner sides with the sun gear 20, and an outer set consisting of a plurality of outer planetary pinions 24 meshed at their inner sides with the inner planetary pinions 22, and meshed at their outer sides with the ring gear 26. The sun gear 20 is fixedly coupled to a driving shaft 18 of a driving pulley assembly 17, and a brake 30 is provided for rotationally engaging the ring 26 to the casing of the transmission and for thus stopping the rotation of ring 26, while a clutch 34 is provided for rotationally engaging the carrier 28 with the sun gear 20 (actually via portions of a fixed driving pulley member 32 to be described shortly). Thus, when the brake 30 is released and the clutch 34 is engaged, the rotational power of the crankshaft 12 is transmitted, via the fluid clutch 10, directly to the driving shaft 18 with no alteration of rotational speed; but on the other hand, when the brake 30 is engaged and the clutch 34 is released, the rotational power of the crankshaft 12 is transmitted, via the fluid clutch 10, through the carrier 28 and via the planetary pinions 22 and 24 which perform planetary action to the sun gear 20 and thence to the driving shaft 18, with a substantial gearing down action, i.e. with a substantial decrease in rotational speed.

In the continuously variable belt transmission device 16, reference numeral 17 generally denotes a driving pulley assembly, which has as a power input member the aforementioned driving shaft 18, while reference numeral 19 generally denotes a driven pulley assembly. These two pulley assemblies 17 and 19 are mounted on parallel axes and are located generally opposite to one another, these parallel axes remaining fixed, and thus the distance between the pulley assemblies 17 and 19 remains fixed during operation. The driving pulley assembly 17 comprises two conical pulley members: an axially fixed driving pulley member 32 and an axially movable driving pulley member 40, which are axially opposed with their respective conical faces 32a and 40a, which are formed with substantially equal cone angles, facing one another along the axial line of said driving pulley assembly 17. The axially fixed driving pulley member 32, is integrally formed together with or is rotationally fixed to the driving shaft 18, while the axially movable driving pulley member 40 is engaged in an axially slidable fashion over said driving shaft 18. Thus, as said axially movable driving pulley member 40 is moved axially to the right or left in the drawing, the V-shaped groove 21 which is defined between the opposing conical faces 32a and 40a is continuously respectively either narrowed or widened, its angle of course remaining constant.

The left side in the drawing of the axially movable driving pulley member 40 is formed in a hollow shape, and the opening of this hollow shape is closed by a back plate assembly 41 which is fixed on the driving shaft 18 and includes an inside cylinder member 41a and an outside cylinder member 41b and is adapted to define a pressure chamber 46 by cooperation with an annular piston member 40 connected to the axially movable pulley member 40. According to the selective supply from a hydraulic fluid pressure control device to be described hereinafter of actuating hydraulic fluid pressure to this pressure chamber 46, through conduit means (not shown) but are provided through the shaft 18, the movable pulley member 40 may be moved rightwards or leftwards as mentioned above, so as to alter the width of the V-shaped groove 21.

Likewise, the driven pulley assembly 19 comprises two conical pulley members: an axially fixed driven pulley member 38 and an axially movable driven pulley member 42. These pulley members 38 and 42 are axially opposed, with their respective conical faces 38a and 42a, which are formed with substantially equal cone angles which are also substantially equal to the cone angles of the conical faces 32a and 40a of the pulley members 32 and 40 of the driving pulley assembly 17, facing one another along the axial line of said driven pulley assembly 19. The axially fixed driven pulley member 38 is integrally formed together with or is rotationally fixed to a driven shaft 36, which extends along said axial line of said driven pulley assembly 19, while the axially movable driven pulley member 42 is engaged in an axially slidable fashion over said driven shaft 36. Thus, as said axially movable driven pulley member 42 is moved axially to the left or right in the drawing, the V-shaped groove 23 which is defined between the opposing conical faces 38a and 42a is continuously respectively either narrowed or widened, its angle of course remaining constant.

The right side in the drawing of the axially movable driven pulley member 42 is formed in a hollow shape, and the opening of this hollow shape is closed by a back plate assembly 43 which is fixed to the driven shaft 36 and includes a piston member 43a and is adapted to define a pressure chamber 48 by cooperation with a cylinder member 42b connected to the axially movable pulley member 42. According to the selective supply from said hydraulic fluid pressure control device to be described hereinafter of actuating hydraulic fluid pressure to this pressure chamber 48, the movable pulley member 42 may be moved leftwards or rightwards as mentioned above, so as to alter the width of the V-shaped groove 23.

Around the driving pulley assembly 17 and the driven pulley assembly 19, fitting into the respective V-shaped grooves 21 and 23 thereof, there is provided an endless belt assembly 44. This endless belt assembly 44 is of isosceles trapezoidal cross sectional shape, and typically in actual construction, although this is not shown in the figure, comprises a plurality of substantially identical transmission blocks which are made of a material which has an appropriate coefficient of friction with respect to the material of the pulley members. These transmission blocks can fit snugly into the V-shaped grooves 21 and 23 with their side surfaces contacting the conical surfaces 32a and 40a or 38a and 42a. The endless belt assembly 44 typically further comprises two endless bands (also not shown) made of thin metallic plate or the like which are looped around the driving pulley assembly 17 and the driven pulley assembly 19 in an axially spaced apart manner, with the transmission blocks fixed as somewhat spaced apart along the bands, typically by said bands being fitted into grooves on the blocks.

Thus, when the distance between the axially fixed driving pulley members 32 and 40 of the driving pulley assembly 17 and the distance between the pulley members 38 and 42 of the driven pulley assembly 19 are so adjusted that the endless belt assembly 44 is stretched taut between the pulley assemblies 17 and 19, which can be done in any one of a continuous range of settings, then, when the driving shaft 18 is rotated by the engine crankshaft 12 via the fluid clutch 10, power is transmitted by the endless belt assembly 44 to the driven shaft 36, at a speed change ratio (the ratio of the input rotational speed of the driving shaft 18 to the output rotational speed of the driven shaft 36) which is determined by the ratio between the radiuses of the two runs of the endless belt assembly 44. And, by moving the axially movable driving pulley member 40 towards or away from the axially fixed driving pulley member 32 along the driving shaft 18, while simultaneously moving the axially movable driven pulley member 42 towards or away from the axially fixed driven pulley member 38 along the driven shaft 36, which can be done by appropriate supply of fluid to the pressure chambers 46 and 48, while always keeping the endless belt assembly 44 appropriately taut, the speed transmission ratio can be continuously varied without interrupting power transmission.

On the driven shaft 36 there is fixedly mounted a driving gear wheel 52, which is meshed with a driven gear wheel 54 fixedly mounted on a counter shaft 50. Also fixedly mounted on said counter shaft 50 is a driving gear wheel 60, which is meshed with a driven crown gear wheel 58 of a differential device 56 of a per se known type. From this differential device 56 there extend left and right shafts 62 and 64, which are rotationally coupled to the driving wheels, not shown, of the vehicle.

A continuously variable belt transmission device system of this general basic type, so far as it has been described hereinabove, is per se known, and has been disclosed for example in Japanese Patent Laying Open Publication Ser. No. 55-6783 (1980). Now, with reference to FIG. 2 which is a general hydraulic circuit diagram, the first preferred embodiment of the hydraulic fluid pressure control system of the present invention, which is for controlling the continuously variable belt transmission device of FIG. 1, will be explained.

Figure 2:
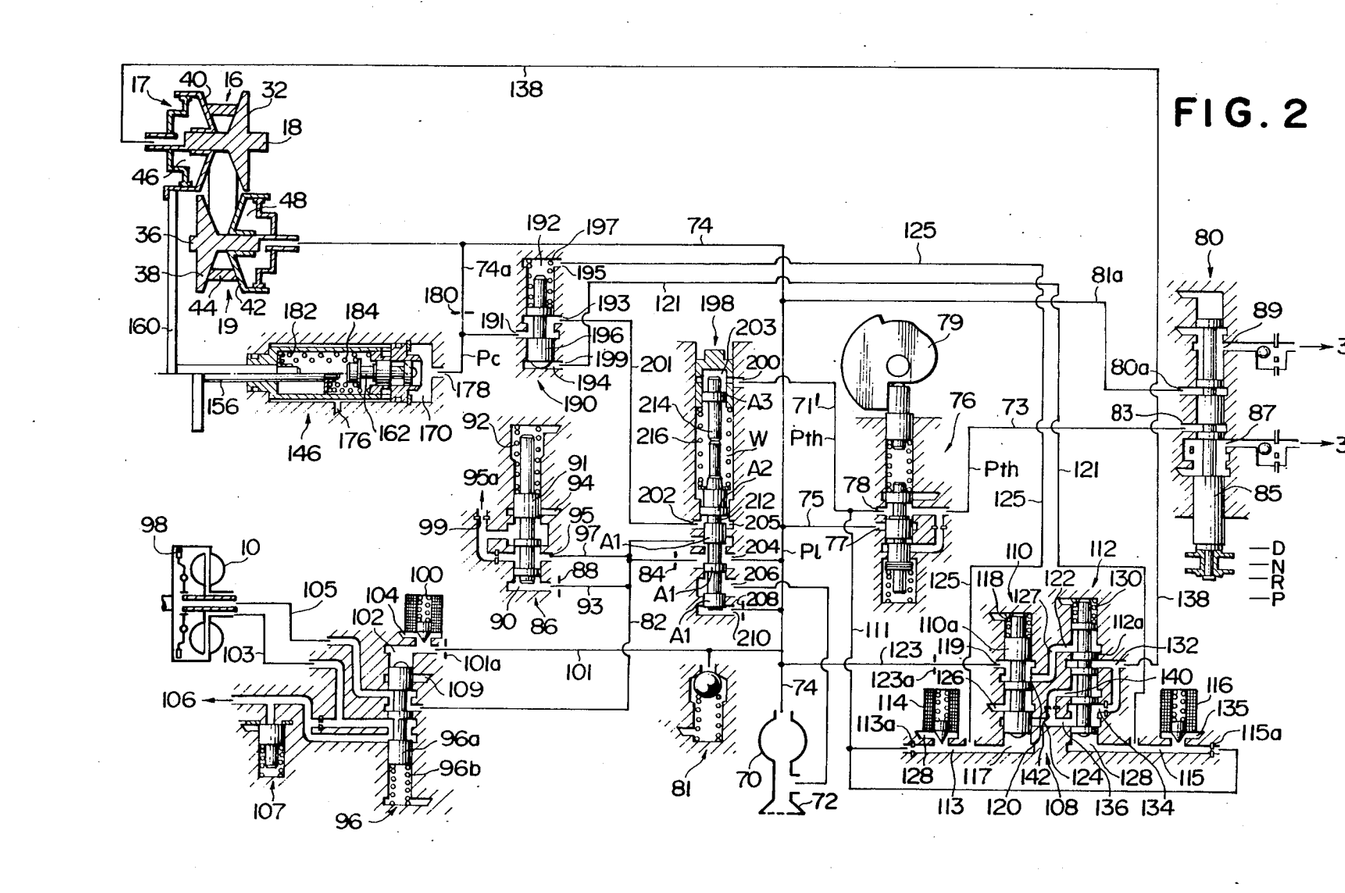
FIG. 2 is a general hydraulic circuit diagram of the first preferred embodiment of the hydraulic fluid pressure control system of the present invention, which is for controlling the continuously variable belt transmission device of FIG. 1.

In this figure, the reference numeral 70 denotes a hydraulic fluid pump, which sucks up hydraulic fluid through a strainer or filter 72, and provides it under pressure into a conduit 74. The pressure of the hydraulic fluid in this conduit 74 hereinafter will be referred to as line pressure "P1", which is an actuation pressure for supply to the fluid chamber 48 of the movable pulley member 42 in the driven pulley assembly 19, as will be described later.

A conduit 75 branching from the conduit 74 leads supply of the line pressure P1 to an input port 77 of a throttle valve 76. This throttle valve 76 is per se known, and produces an output throttle pressure Pth at its output port 78 which represents and increases monotonically with the amount of depression of a throttle pedal, not shown, of the vehicle incorporating this transmission: the movement of said throttle pedal is transmitted via a linkage, also not shown, to rotate a cam 79, which actuates a valve element of the throttle valve 76 in a per se known way. This throttle pressure Pth is supplied via a conduit 73 to an input port 83 of a manual operational mode switching valve 80, which has a valve element 85, which reciprocates in a bore formed in a housing, and which can be selectively positioned by the hand of the vehicle operator, via a linkage which is not shown in the figures, to any one of: a D or drive position for forward driving, a N or neutral position for disengaging the engine from the rear wheels completely, a R or reverse position for reverse vehicle operation, and a P or parking position for locking up the transmission and thus preventing the vehicle from moving. Another input port 80a of the manual switching valve 80 is supplied with the line pressure P1 via a conduit 81a from the conduit 74. When the valve element 85 is positioned to the D or drive range position, then the throttle pressure Pth thus supplied to the port 83 of this valve is transmitted to an output port 87 thereof, whence said pressure is transmitted to a pressure chamber of the clutch 34 of the planetary gear mechanism 14 to engage said clutch 34, and also substantially zero pressure is supplied to another output port 89 of the manual switching valve 80, and said substantially zero pressure is transmitted to a pressure chamber of the brake 30 of the planetary gear mechanism 14 so as not to engage said brake 30, whereby the planetary gear mechanism 14 is put into the forward power transmission state as explained above. On the other hand, when said valve element 85 is positioned to the R or reverse range position, then the throttle pressure Pth supplied to the port 83 of this valve is not transmitted to the output port 87, and substantially zero pressure is transmitted to the pressure chamber of the clutch 34 so as not to engage said clutch 34, while line pressure P1 is supplied to the output port 89 of said manual switching valve 80, and is transmitted to the pressure chamber of the brake 30 so as now to engage said brake 30, whereby the planetary gear mechanism 14 is put into the reverse power transmission state as also explained above. A relief valve 81 is provided for relieving the line pressure P1 in the conduit 74, if its pressure value should rise above a certain determinate value.

A secondary pressure conduit 82 is provided, and is communicated with the conduit 74 via a throttling device 84 and around a port 204 of a primary regulator valve 198 to be described later. A secondary pressure regulator valve 86 comprises a valve element 91, which reciprocates in a bore formed in a housing and is biased downwards in the figure by a compression coil spring 92, while it is biased upwards in said bore by the pressure in a pressure chamber 90 defined at the lower end of said bore in the figure. The pressure in the secondary pressure conduit 82 is communicated to this pressure chamber 90, via a throttling device 88 and a conduit 93, and, when the pressure in the chamber 90 rises to be higher than a certain determinate value, the valve element 91 of said valve 86 rises sufficiently in its bore to vent the conduit 82, via a conduit 97 and a port 95 of said valve 86, to a drain 94. Accordingly, the pressure in the conduit 82 is kept at or below said determinate value. A conduit 95a receives a regulated and modest supply of hydraulic fluid through the valve 86, via a throtting element 99; this conduit 95a is communicated to lubricate various parts of the transmission, although this is not shown.

A lock up clutch control valve 96 is provided, and comprises a valve element which reciprocates in a housing. A control pressure chamber 102 is defined at the upper end in the figure of the bore of said valve 96, pressure in said chamber thus biasing the valve element 96a thereof downwards in the figure, and a compression coil spring 96b biases the valve element 96a upwards in the figure; and this pressure chamber 102 is selectively supplied with the line pressure P1 from the conduit 74 via a conduit 101 and a throttling means 101a, under the control of an electromagnetic fluid control valve 100 which incorporates a solenoid or the like. Thus, when said electromagnetic valve 100 is supplied with actuating electrical energy, then substantially no hydraulic pressure is present in the chamber 102, and the valve element of the valve 96 is in the upwardly displaced position in its bore under the action of the compression coil spring; and in this condition the valve 96 switches a supply of pressure from the secondary pressure conduit 82 to a conduit 103 which leads to the lock up clutch 98, previously mentioned but not shown in FIG. 1, of the fluid clutch 10, while at the same time said valve 96 communicates another conduit 105 which leads to the lock up clutch 98 to a drain 109: the lock up clutch 98 is so constructed as to be engaged, when supplied with fluid via the conduit 103 and drained via the conduit 105, so as to provide direct transmission of the power of the engine to the transmission through it and so as to bypass the fluid clutch 10. On the other hand, when said electromagnetic valve 100 is not supplied with actuating electrical energy, then the value of the hydraulic pressure present in the chamber 102 is substantially line pressure P1, and the valve element 96a is thereby pushed to the downwardly displaced position in its bore against the action of the compression coil spring 96b which is overcome; and in this condition the valve 96 switches the aforesaid supply of pressure from the secondary pressure conduit 82 to the conduit 105 leading to the lock up clutch 98, while at the same time said valve 96 communicates the conduit 103 to a conduit 106 which leads to the inlet of a hydraulic fluid cooler: the lock up clutch 98 is so constructed as to be disengaged, when supplied with fluid via the conduit 105 and drained via the conduit 103, so as to provide transmission of the power of the engine to the transmission only through the fluid clutch 10. In this operational state, a relief valve 107 controls the pressure which is being supplied to said hydraulic fluid cooler.

A speed change speed control device 108 (which is for regulating how quickly speed changing of the transmission of FIG. 1 occurs) comprises first and second control valves 110 and 112, which comprise valve elements 110a and 112a which reciprocate in bores formed in a housing, and first and second electromagnetic fluid control valves 114 and 116. The input sides of the electromagnetic valves 114 and 116 are supplied with the throttle pressure Pth via a conduit system 111 and throttling elements 113a and 115a, and their output sides are connected via respective conduits 113 and 115 to control chambers 117 and 128 respectively, said chambers 117 and 128 being defined at the bottom ends in the figure of the bores of the first and second control valves 110 and 112 respectively. Compression coil springs 118 and 130 respectively bias the valve elements 110a and 112a downwards in the figure in their bores. The line pressure P1 in the conduit 74 is supplied via a conduit 123 and a throtting element 123a to a port 119 of the first control valve 110. And, when the first electromagnetic valve 114 is supplied with actuating electrical energy, then it drains the conduit 113 via a drain 128, so that no hydraulic pressure is supplied via the conduit 113 to the chamber 117, then the valve element 110a is biased downwards by the action of the compression coil spring 118, and the port 119 is connected to no other port, while a port 124 is communicated to a drain port 126. On the other hand, when the first electromagnetic valve 114 is not supplied with actuating electrical energy, then it blocks the draining of the conduit 113, so that the throttle pressure Pth is supplied via said conduit 113 to the chamber 117, and thereby the valve element 111a is biased upwards against the biasing action of the compression coil spring 118, and the port 119 is connected to a port 120, while the port 124 is communicated to no other port. Similarly, when the second electromagnetic valve 116 is supplied with actuating electrical energy, then it drains the conduit 115 via a drain 135, so that no hydraulic pressure is supplied via the conduit 115 to the chamber 128, then the valve element thereof is biased downwards by the action of the compression coil spring 130, and a port 134 thereof is connected to a port 140 thereof, while a port 122 thereof is communicated to a port 132 thereof. On the other hand, when the second electromagnetic valve 116 is not supplied with actuating electrical energy, then it blocks the draining of the conduit 115, so that the throttle pressure Pth is supplied via said conduit 115 to the chamber 128, and thereby the valve element 112a is biased upwards against the biasing action of the compression coil spring 130, and the port 134 is connected to a port 136, while the port 132 and the port 122 are isolated and are communicated to no other ports. The port 120 of the first control valve 110 is communicated with the port 122 of the second control valve 112 via a conduit 127, while the port 124 of said first control valve 110 is communicated to the port 140 of the second control valve 112 via a conduit and a throttling device 142 and also to the other port 136 of said second control valve 112 via another conduit. In addition, respective conduits 125 and 121 lead supply of the pressures in the conduits 113 and 115 to opposite ends of a cutoff valve 190, to be described later, which relates to the gist of the present invention, while a conduit 138 leads the pressure at the port 132 of the second control valve 112 to the pressure chamber 46 of the driving pulley assembly 17.

Thus, the function of this speed change speed control device 108 is as follows. The first and second electromagnetic valves 114 and 116 are selectively energized by an electrical control system (not shown) in the figures according to various operational parameters of the vehicle and of the continuously variable belt transmission device. When the first electromagnetic valve 114 is not energized but the second electromagnetic valve 116 is energized, then the valve element 110a is up and the valve element 112a is down, and the line pressure P1 is supplied via the ports 119 and 120 of the first control valve 110 which are mutually communicated, via the conduit 127, via the ports 122 and 132 of the second control valve 112 which are mutually communicated, and through the conduit 138 to the pressure chamber 46 of the driving pulley assembly 17, at a fairly high rate due to the relatively low flow resistance of this hydraulic fluid flow path, and thus the speed change ratio of the continuously variable belt transmission device decreases at a relatively rapid rate. When the first electromagnetic valve 114 is not energized and the second electromagnetic valve 116 is also not energized, then the valve elements 110a and 112a are both up as shown in FIG. 2, and no path is available for hydraulic fluid to be either supplied to or drained from the conduit 138 and the pressure chamber 46 of the driving pulley assembly 17, and accordingly the speed change ratio of the continuously variable belt transmission device is kept constant. When the first electromagnetic valve 114 is energized but the second electromagnetic valve 116 is not energized, the valve element 110a is down and the valve element 112a is up, and then the hydraulic fluid in the pressure chamber 46 of the driving pulley assembly 17 is drained through the conduit 138, via the ports 134 and 136 of the second control valve 112 which are mutually communicated, to the port 124 of the first control valve 110 (bypassing the throttling element 142), and to the drain port 126 which is communicated with said port 124; and thus the speed change ratio of the continuously variable belt transmission device is increased at a relatively rapid rate, since the flow resistance of this fluid path is relatively low. When the first electromagnetic valve 114 is energized and the second electromagnetic valve 116 is also energized, then the valve elements 110a and 112a are both down, and then the hydraulic fluid in the pressure chamber 46 of the driving pulley assembly 17 is drained through the conduit 138, via the ports 134 and 140 of the second control valve 112 which are now mutually communicated, to the port 124 of the first control valve 110 now only via the throttling element 142, and to the drain port 126 which is communicated with said port 124; and thus the speed change ratio of the continuously variable belt transmission device is increased at a relatively low rate, since the flow resistance of this fluid path is relatively high.

A speed change ratio detecting valve 146 is provided for producing a control pressure Pc which is related to the axial position of the movable driving pulley member 40 of the driving pulley assembly 17, i.e. to the actual speed change ratio being provided by the continuously variable belt transmission device; this pressure Pc provides information for feeding back to the hydraulic control system, so that a desired speed change ratio can be assured. This speed change ratio detecting valve 146 is shown in enlarged detail in FIG. 3, which is a longitudinal section thereof. First, to describe the action in summary, hydraulic fluid at line pressure P1 in the conduit 74 is supplied via a branch conduit 74a and a throttling device 180 to a port 178, which releases some of said hydraulic fluid via the valve 146 to a drain port 176, according to the aforementioned axial position of the movable driving pulley member 40, thus modifying the pressure at said port 178 to the aforementioned control pressure Pc representative of the actual speed change ratio being provided by the continuously variable belt transmission device; this pressure Pc is supplied to a cutoff valve 190 described later.

Figure 3:
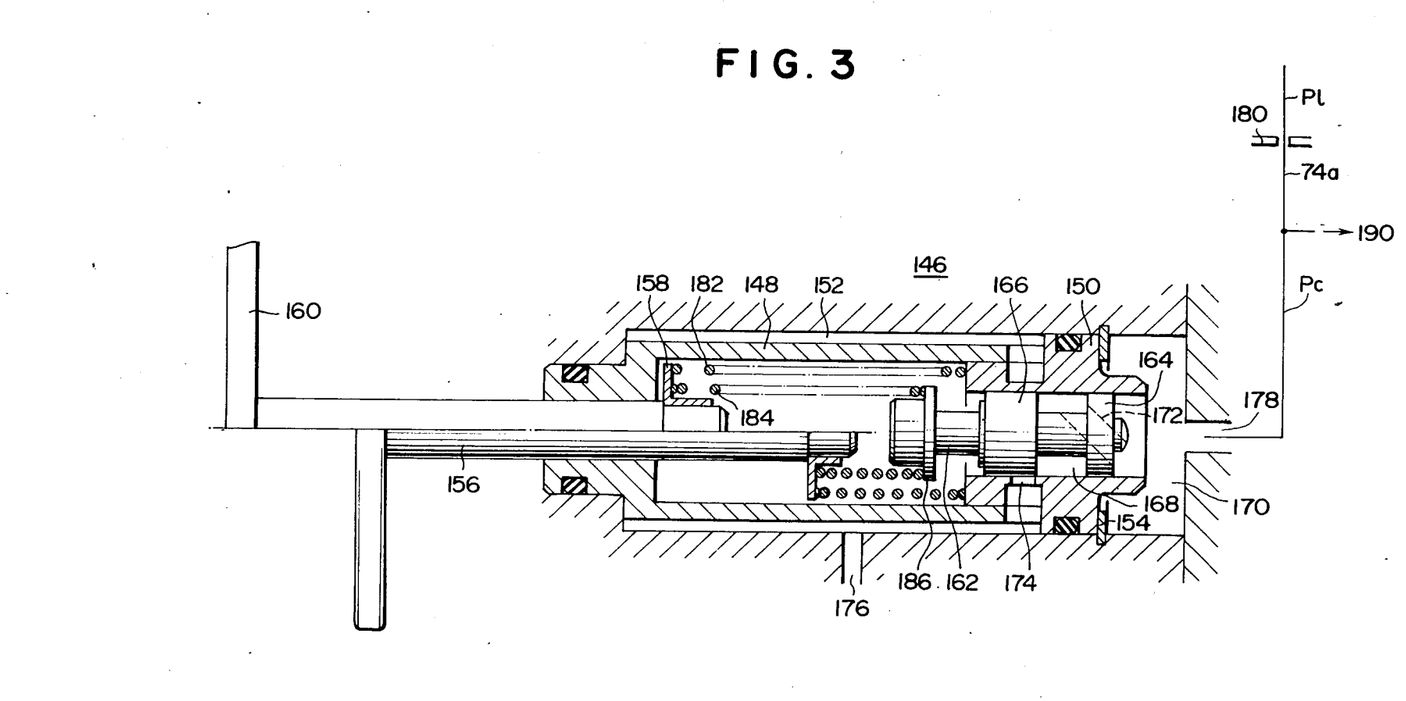
FIG. 3 is a detailed longitudinal sectional view of a speed change ratio detecting valve incorporated in said first preferred embodiment of the hydraulic fluid pressure control system of the present invention.

Now, in detail, the speed change ratio detecting valve 146 comprises a bore 152 formed in a housing and a first sleeve 148 and a second sleeve 150 which are coaxially abutted together and are fixedly held in said bore 152 against its bottom end by a snap ring 154, thus defining a chamber 170 at the right end of the valve 146 in the figure to which the aforesaid port 178 opens. The left end in the figure of the first sleeve 148 is formed with a slide bore, in which a rod 156 is slidably inserted so as to be movable to and fro in the axial direction. A spring seat 158 is fixed on the right end in the figure of the rod 156, i.e. on its end inside the valve 146, and to the left end in the figure of the rod 156, i.e. to its end outside the valve 146, there is fixedly attached one end of a connection rod 160, the other end of which is coupled to the movable driving pulley member 40 of the driving pulley assembly 17. Two compression coil springs, an outer one 182 and an inner one 184, are mounted within the first sleeve 148 with their left ends in the figure bearing against this spring seat 158. The right end in the figure of the spring 182 bears against the end of the second sleeve 150, which is axially fixed, and thus this spring 182 only provides the function of biasing the rods 156 and 160 leftwards in the figure. The right end in the figure of the spring 184 bears against a valve seat 186 fixed on the left hand end of a valve element 162, which has first and second lands 164 and 166 which are both slidably engaged in the bore of the second sleeve 150 so as to axially mount the valve element 162 in said second sleeve 150 in a reciprocable fashion. An annular chamber 168 is defined between said first and second lands 164 and 166, and is communicated via a pasage 172 formed in said first land 164 with the chamber 170; thereby the pressure at the port 178 is freely communicated to the annular chamber 168. The second sleeve element 150 is formed with a port 174 which communicates its inside bore to the drain conduit 176 via the space around the first sleeve 148 between its outer surface and the bore 152. The second land 166 controls the communication of the annular chamber 168 and therefore of the port 178 to this drain conduit 176, according to the axial position of the valve element 162, which is biased leftwards by the pressure in said annular chamber 168, while it is biased rightwards by the compression coil spring 184.

Figure 4:
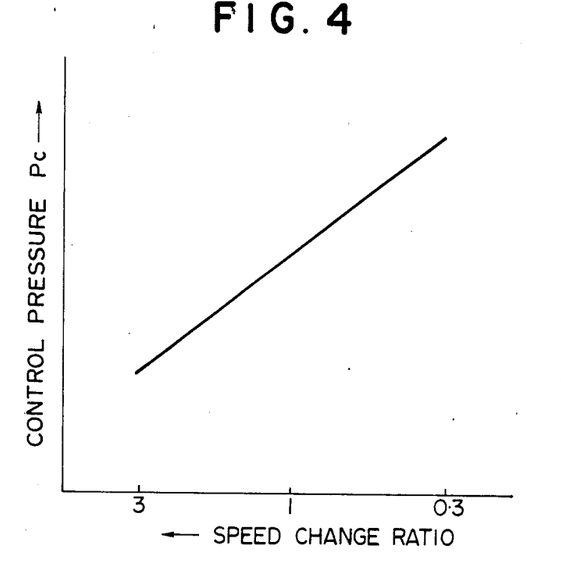
FIG. 4 is a graph in which the speed change ratio provided by the continuously variable belt transmission device is shown in a non linear diminishing fashion along the horizontal axis, and a control pressure Pc produced by the action of the speed change ratio detecting valve of FIG. 3 is shown in a linear increasing fashion along the vertical axis.

Thereby, during operation, the valve element 162 hovers to and fro about an exactly equilibrium position which allows just so much of the pressure in the pressure chamber 170 to escape past the first land 166 to the drain conduit 176, as to reduce the pressure in said pressure chamber 170 to an equilibrium pressure Pc just sufficient to hold the valve element 162 in this position against the current compression force of the compression coil spring 184 which depends upon the axial position of the rod 156 and hence upon the axial position of the movable pulley member 40; and accordingly this equilibrium pressure Pt is brought to depend upon said axial position of said movable pulley member 40. In fact, the greater is the speed change ratio of the continuously variable belt transmission device, the further, in said driving pulley assembly 17, the axially movable pulley member 40 is from the axially fixed pulley member 32, and according thereto the more is the rod 156 withdrawn to the left in FIG. 3 out of the first sleeve member 148 the weaker the biasing force is to the right exerted by the compression coil spring 184 on the valve member 162, and accordingly the greater the equilibrium opening amount is of the valve port 174 left open by the second and 166 of said valve element 162 and the weaker the valve is of the equilibrium pressure Pc regulated in the chamber 170 and output from the port 178 as the control pressure. In other words, the equilibrium pressure Pc is a decreasing function of the speed change ratio of the continuously variable belt transmission device: this relationship is diagrammatically illustrated in FIG. 4, which is a graph in which the speed change ratio is shown in a non linear diminishing fashion along the horizontal axis, and the control pressure Pc is shown in a linear increasing fashion along the vertical axis. This matter relates to another inventive concept invented by the same inventors as the present invention, for which copending patent application Ser. No. 06/669,886 now abandoned, has been filed.

Referring once again to FIG. 2, the cutoff valve 190, which forms the gist of the present invention, comprises a valve element 196 which reciprocates in a bore formed in a housing, and receives the supply of the control pressure Pc at its port 191. This valve element 196 may be subjected to three forces: a downward biasing force always exerted by a compression coil spring 197 fitted, in a first control pressure chamber 192 defined in said bore above said valve element 196; another downward force selectively exerted on said valve element 196 by selective supply of the throttle pressure Pth through a first control port 195 to said first control chamber 192 via the conduit 125 from the conduit 113 of the speed change speed control device 108, when and only when the first electromagnetic valve 114 is not energized as explained previously; and an upward force selectively exerted on said valve element 196 by selective supply of the throttle pressure Pth through a second control port 199 to a second control chamber 194 defined in said bore below said valve element 196, via the conduit 121 from the conduit 115 of the speed change speed control device 108, when and only when the second electromagnetic valve 116 is not energized as also explained previously. When the valve element 196 is upwardly displaced, as it only happens when the chamber 194 is being provided with hydraulic pressure and the chamber 192 is not being provided with hydraulic pressure, when the first electromagnetic valve 114 is energized and the second electromagnetic valve 116 is not energized, the input port 191 is disconnected from an output port 193 by the valve element 196; but in all other combinations of energization of the first and second electromagnetic valves 114 and 116 the valve element 196 is downwardly displaced as shown in FIG. 2, and said input port 191 is communicated to said output port 193. Thus, the cutoff valve 190 serves to cut off supply of the control pressure Pc to the conduit 201, when and only when the first electromagnetic valve 114 is energized, but the second electromagnetic valve 116 is not energized. The effect of this cutoff action on transmission operation will be explained shortly.

A primary regulator valve 198 is provided for regulating the line pressure Pl, and comprises a bore formed in a housing, a first valve element 212 and a second valve element 214 slidingly mounted in said bore as axially abutted, and a compression coil spring 216 which biases said first valve element 212 downwards in the figure. The force exerted by this compression coil spring 216 will be referred to as W. A port 200 opens to a control pressure chamber 203 defined above the valve element 214 is supplied with the throttle pressure Pth via a conduit 71'. The effective cross sectional area of the land of the valve element 214 on which pressure in the control pressure chamber 203 acts will be referred to as A3. At an intermediate portion of the first valve element 212 there is defined a control pressure chamber 205 between two of its lands, to which a port 202 opens; the effective cross sectional areas of the lands of the valve element 212 on which pressure in said chamber 205 acts will be referred to as A2 and A1 respectively, and A2 is less than A3, while A1 is less than A2 and a fortiori is less than A3. The output port 193 of the cutoff valve 190 is communicated to this port 202 opened to the control chamber 205. The effective cross sectional area of the land of the valve element 212 on which the line pressure Pl supplied via a throttling element 208 to a control pressure chamber 210 acts, is also equal to A1. Further, the port 204 to which also the line pressure Pl is supplied from the conduit 74, is selectively communicated to a drain port 206, when the valve element 212 moves upwards beyond a determinate position; but the pressure at this port 204 does not drive the valve element 212 in either direction, because the lands of said valve element 212 above and below said port 204 are of equal cross sectional area, in fact equal to A1, and accordingly this port 204 is not a control port.

Thus, when the valve element 212 is at an intermediate equilibrium position in the bore of the valve 198, the following equation holds:

$$W + A3 \cdot Pth = A1 \cdot Pl + (A2 - A1) \cdot Pc \qquad (1)$$

Therefore, $$Pl = (W + A3 \cdot Pth - (A2 - A1) \cdot Pc)/A1 \qquad (2)$$

and as commented before the land area A2 is larger than the land area A1, so that A2−A1 is positive.

Figure 5:
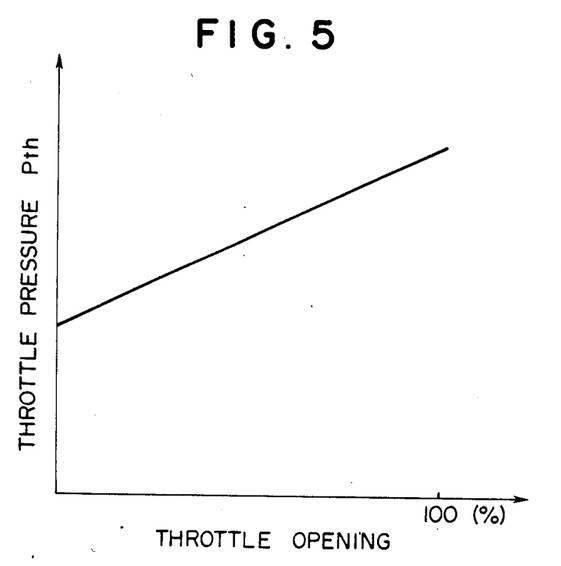
FIG. 5 is a graph in which throttle opening amount is shown along the horizontal axis and a throttle pressure Pth is shown along the vertical axis.
Figure 6:
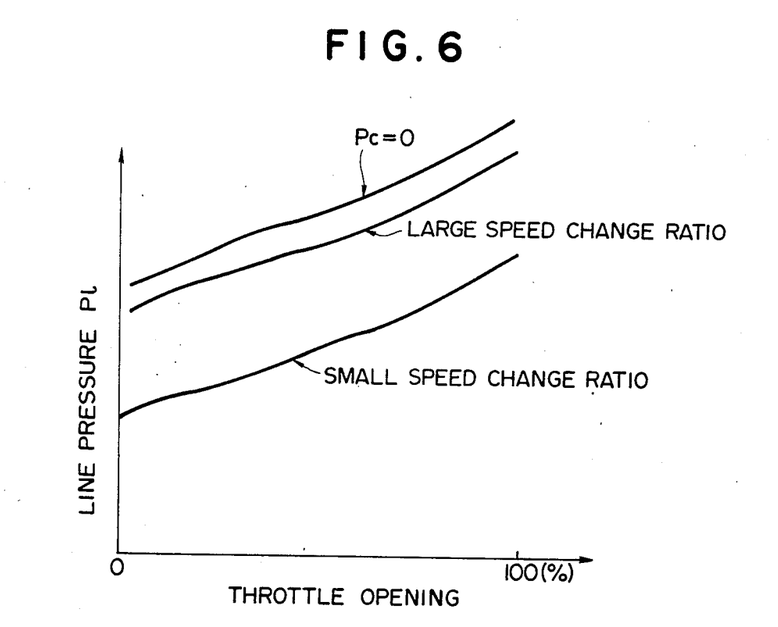
FIG. 6 is a graph in which throttle opening amount is shown along the horizontal axis and a line pressure P1 is shown along the vertical axis, showing various different relationships between the line pressure P1 and the throttle opening amount, according to different values of the speed change ratio being provided by the continuously variable belt transmission device and according to the aforementioned control pressure Pc.

As shown in FIG. 5, which is a graph in which throttle opening is shown along the horizontal axis and throttle pressure Pth is shown along the vertical axis, the throttle pressure Pth is basically a linearly increasing function of the throttle opening of the engine of the vehicle. Further, as discussed above with reference to FIG. 4, the control pressure Pc outputted from the speed change ratio detecting valve 146 is a decreasing function of the speed change ratio of the continuously variable belt transmission device: and accordingly the relationship of the line pressure Pl to the throttle opening, for high and low values of the speed change ratio of the continuously variable belt transmission device, is as indicated in FIG. 6 by the two lower lines; in this figure, throttle opening is shown along the horizontal axis and line pressure Pl is shown along the vertical axis. In more detail, the smaller is the speed change ratio, the greater is the value of the control pressure Pc, and accordingly the lesser the line pressure Pl corresponding to a particular throttle opening becomes. Since the output torque Tout on the driven pulley assembly 19 is equal to the input torque Tin on the driving pulley assembly 17 multiplied by the speed change ratio, therefore, for the same amount of input torque Tin, as the output torque Tout of the transmission increases, the greater does the line pressure P1 become, and, since this line pressure P1 is supplied to the pressure chamber 48 of the driven pulley assembly 19, accordingly the more tightly the endless belt assembly 44 is gripped between the axially fixed driven pulley member 38 and the axially movable driven pulley member 42 of said driven pulley asembly 19. This is as it should be, because this tighter gripping is required in order to ensure good transmission of the increased torque from the endless belt assembly 44 to this driven pulley assembly 19, and thereby proper torque transmission between the driving and driven pulley assemblies 17 and 19 of the continuously variable belt transmission device 16 is assured, and slippage of and possible damage to the endless belt assembly 44 are positively prevented. Further, if sticking should occur in the speed change ratio detecting valve 146, which might cause its output control pressure Pc to be improperly reduced, or if leakage should occur in the hydraulic conduit system including the conduit 201 which leads this control pressure Pc to the primary regulator valve 198 or in the cutoff valve 190—any of these occurrences leading to the control pressure Pc at the port 202 of the primary regulator valve dropping abnormally and improperly—then, since the line pressure P1 will in any case rise in these failure type circumstances and will never drop, slippage of the endless belt assembly 44 and damage thereto are positively avoided, even in such a case of abnormal operation.

Now, the effect of the cutoff valve 190, which relates to the gist of the present invention, will be described.

As explained above, this cutoff valve 190 normally transmits the control pressure Pc from the speed change ratio detecting valve 146 to the port 202 of the primary regulator valve 198 without substantially modifying said control pressure Pc, and only when the first electromagnetic valve 114 is energized but the second electromagnetic valve 116 is not energized, does said cutoff valve 190 intercept said supply of said control pressure Pc to said port 202 of the primary regulator valve 198, said port 202 accordingly receiving an effective control pressure Pc equal to zero. Accordingly, as indicated in FIG. 6 by the uppermost line designated "Pc=0", the value of line pressure Pl, for each particular value of throttle opening, is at its maximum. This maximum value of line pressure P1 is transmitted to the pressure chamber 48 of the driven pulley assembly 19. At this time, with the first and second electromagnetic valves 114 and 116 actuated in the specificed combination, the hydraulic fluid in the pressure chamber 46 of the driving pulley assembly 17 is being drained through the conduit 138 and through a conduit system with a relatively low overall flow resistance, and hence the speed change ratio of the continuously variable belt transmission device is being increased at a relatively rapid rate. Therefore, at this time of rapid increase of speed change ratio a high value of line pressure P1 is made available to the pressure chamber 48 of the driven pulley assembly 19.

According to such structure, therefore, when a sudden increase of speed change ratio is required, said cutoff valve 190 prevents transmission of said control pressure Pc from the control pressure generating valve 146 to the line pressure generating valve 198, and this produces an effect on the line pressure generating valve 198 that it generates a line pressure P1 of the maximum level, which is supplied to its pressure chamber 48. Thus, the construction of this control device is such that a quick increase of the speed change ratio provided by the continuously variable belt transmission device is available, when required. Thus, satisfactory speed change ratio alteration is always ensured, and the likelihood of damage to the endless belt assembly 44 caused by excessive tension caused by too high constant line pressure is reduced. Thereby the durability of the continuously variable belt transmission device is good. Because the resetting of the position of the axially driven pulley member 42 of the driven pulley assembly 19 is performed by using a necessary and sufficient line pressure at all times, this control device always provides good drivability for the vehicle to which it is fitted, because it allows swift and satisfactory increase of the speed change ratio of the continuously variable belt transmission device, by allowing this resetting of the axial position of said axially driven pulley member 42 to be performed in a celeritous fashion. Further, this control device for a continuously variable belt transmission device allows vehicle fuel consumption to be kept good, and ensures good and reliable transmission of the rotational power of the engine to the driving wheels of the vehicle, while reliably preventing slippage of the belt assembly 44 on the driving and driven pulley assemblies 17 and 19. Also, by minimizing the actual requirements for line pressure by keeping this line pressure P1 low by the use of the line pressure generating valve 198 when the cutoff valve 190 is not in operation to cut off transmission of the control pressure Pc, this control device prevents any unnecessary power loss in the hydraulic fluid pressure pump 70 of the continuously variable belt transmission device. By this quick alteration of the effective radius of the driven pulley assembly 19, this control device for a continuously variable belt transmission device reliably sets the speed change ratio at a maximum when the vehicle is stationary, or in so called kickdown conditions, by rapidly increasing said speed change ratio as the vehicle comes to a halt, and thus reliably ensures that the speed change ratio is set to a maximum value when the vehicle is starting off from rest. On the other hand, in normal non-stopping vehicle operational conditions, the line pressure generating valve 198 generates a line pressure which is smaller the smaller is the speed change ratio, according to the control exerted on said valve 198 by the control pressure Pc, and accordingly excessive strain on the endless belt assembly 44 is prevented and the durability of the endless belt assembly 44 and of the transmission as a whole is improved.

Figures 7, 10:
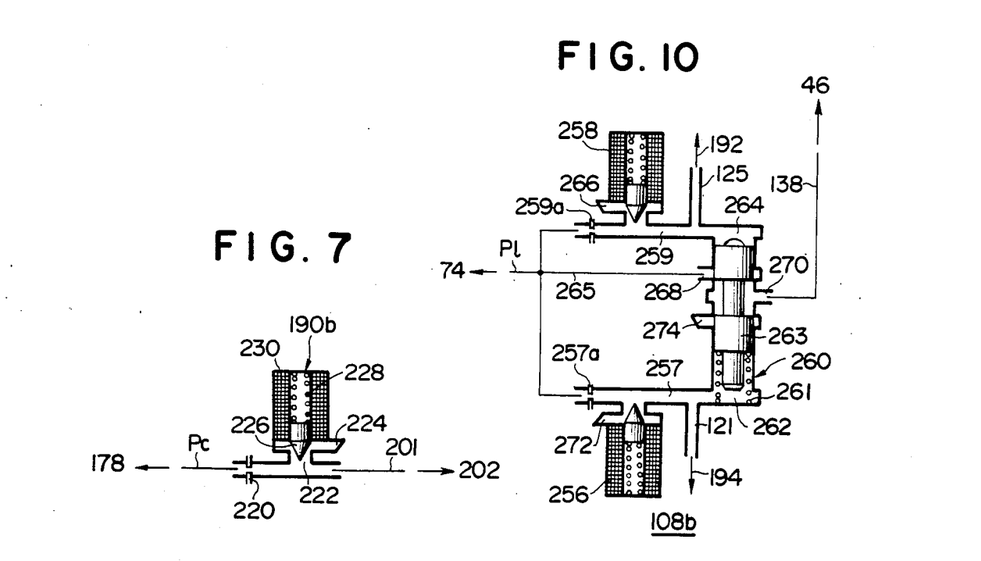
FIG. 7 is a schematic view of a cutoff valve incorporated in the second preferred embodiment of the hydraulic fluid pressure control system of the present invention.
FIG. 10 is a schematic sectional view of a speed change speed control device, incorporated in the fourth preferred embodiment of the hydraulic fluid pressure control system of the present invention.

In FIG. 7, there is shown another possible construction for the cutoff valve, in a second preferred embodiment of the hydraulic fluid pressure control device according to the present invention; this cutoff valve is designated by the reference numeral 190b. In this second preferred embodiment, the parts of the control device which are not shown are the same as in the first preferred embodiment of FIGS. 1 to 3.

In this second preferred embodiment, the valve 190b intercepts the supply of the control pressure Pc from the speed change ratio detecting valve 146 to the port 202 of the primary regulator valve 198 not by blocking it off, but rather by bleeding it away. Specifically, in the conduit 201 between the valve 190b and the speed change ratio detecting valve 146 there is provided a throttling device 220, and the valve 190b has an orifice 222 which leads the side of the conduit 201 downstream of the throttling device 220 to a hydraulic fluid drain 224. The opening and closing of this orifice 222 is selectively controlled by a control plunger 226 incorporated in a solenoid 230. When the solenoid 230 is not energized, then a compression coil spring 228 pushes the end of the control plunger 226 against the orifice 220 and closes said orifice 220, and in this operational condition the transmission of the control pressure Pc from the speed change ratio detecting valve 146 to the port 202 of the primary regulator valve 198 is not interfered with. On the other hand, when a maximum value of the line pressure Pl is required, i.e. when as explained above the speed change ratio of the continuously variable belt transmission device is to be quickly increased and accordingly the first electromagnetic valve 114 is energized, but the second electromagnetic valve 116 is note energized, then also actuating electrical energy is supplied to the electromagnetic switching device 230 by an electrical control system, not shown, and against the biasing action of the compression coil spring 228 the control plunger 226 is up pulled so that the orifice 222 is opened, and in this operational condition the control pressure Pc is drained substantially completely from the portion of the conduit 201 downstream of the throttling device 220, and thereby the transmission of the control pressure Pc from the speed change ratio detecting valve 146 to the port 202 of the primary regulator valve 198 is substantially totally prevented. Thereby, according to this second preferred embodiment of the present invention, it will be understood that the same operational effect is attained as in the first preferred embodiment, but by a different construction.

Figure 8:
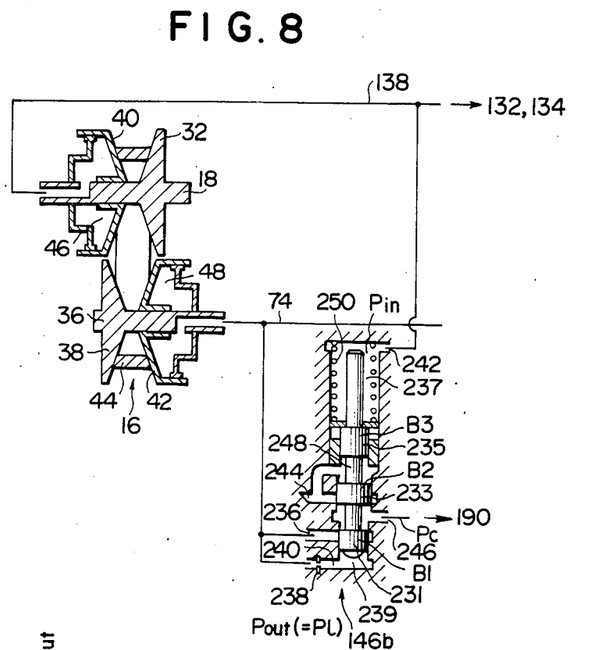
FIG. 8 is a schematic sectional view of a speed change ratio detecting valve incorporated in the third preferred embodiment of the hydraulic fluid pressure control system of the present invention.

In FIG. 8, there is shown another possible construction for the speed change ratio detecting valve, which is designated by the reference numeral 146b. In this embodiment, the parts of the control device which are not shown are the same as in the first preferred embodiment of FIGS. 1 to 3.

In this embodiment, the valve 146b does not directly receive any motion from either of the movable driving and driven pulley members 40 and 42 of the driving and driven pulley assemblies 17 and 19. Thus, in this embodiment, the valve 146b comprises a valve element 248 which slides in a bore formed in a housing, said valve element 248 having first, second, and third lands 231, 233, and 235 which respectively have cross sectional areas which will be referred to as B1, B2, and B3: B2 is greater than B1, and B2 is also greater than B3. A compression coil spring 250 is provided in a first pressure chamber 237 defined above the valve element 248, and this compression coil spring 250 biases the valve element 248 downwards in the figure with a force which will be referred to as X. A supply of the pressure in the conduit 138 which is being provided to the pressure chamber 46 of the driving pulley assembly 17 is also provided to this first pressure chamber 237 at a port 242 thereof. A second pressure chamber 239 is defined below the valve element 248; a supply of the line pressure Pl in the conduit 74 which is being provided to the pressure chamber 48 of the driven pulley assembly 19 is provided to this second pressure chamber 239 at a port 238 thereof. The line pressure Pl in the conduit 74 is also provided to a port 236 of the valve 146b. Another port 246 of the valve 146b, at which port 246 as in due course will be seen the control pressure Pc is produced, is communicated to this port 236, past the first land 231, when the valve element 248 is positioned below a certain first determinate position; but this port 246 is on the other hand communicated to another port 244 which is a drain port, when said valve element 248 is positioned above a second certain determinate position higher than said first determinate position in the bore of the valve 146b.

This valve 146b operates as follows. As the speed change ratio provided by the transmission increases, the flow rate by which the hydraulic fluid present at the port 246 is exhausted from the drain 244 increases, and the control pressure Pc present at said port 246 therefore falls. In more detail, in terms of the quantities defined above, from the equilibrium relationship for the valve element 248:

$$X + B3 \cdot Pin = (B2 - B1) \cdot Pc + B1 \cdot Pl \qquad (3)$$

where Pin is the hydraulic pressure in the pressure chamber 46 of the driving pulley assembly 17, and Pl, which is the line pressure, is the hydraulic pressure in the pressure chamber 48 of the driven pulley assembly 19, which may be expressed as Pout.

Eliminating Pc from this equation (3) and the equation (1) above relating to the primary regulator valve 198, and solving for Pl, gives the following equation:

$$Pl = (W \cdot (B2 - B1) - X \cdot (A2 - A1) - \\ + A3 \cdot (B2 - B1) \cdot Pth)/(B2 \cdot A1 - B1 \cdot A2 + (A2 \\ - A1) \cdot B3 \cdot K) \qquad (4)$$

where K = Pin/ Pl = Pin/ Pout.

Figure 9:
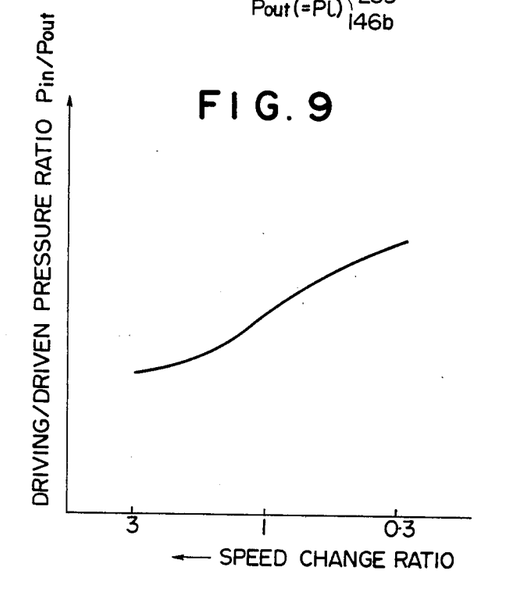
FIG. 9 is a graph, relating to this third preferred embodiment, in which the speed change ratio provided by the continuously variable belt transmission device is shown in a non linear diminishing fashion along the horizontal axis, and the ratio between pressures supplied to pressure chambers of driving and driven pulley assemblies of the continuously variable belt transmission device is shown along the vertical axis.

The throttle pressure Pth is as shown in FIG. 5 discussed above an increasing function of the throttle opening amount of the engine of the vehicle, and the ratio Pin/Pout between the pressures Pin and Pout supplied to the pressure chambers 46 and 48 of the driving and driven pulley assemblies 17 and 19 is a decreasing function of the speed change ratio of the continuously variable belt transmission device, as shown in FIG. 9 which is a graph in which the speed change ratio provided by the continuously variable belt transmission device is shown in a non linear diminishing fashion along the horizontal axis and this driving/driven pressure ratio Pin/Pout is shown nlong the vertical axis. Therefore, the line pressure Pl will, as a function of K as expressed by the above equation (4), that is as a function of the speed change ratio, have a larger value when the speed change ratio of the continuously variable belt transmission device is large, just as shown in FIG. 6 and discussed above with respect to the first embodiment, thus providing the same performance as the first embodiment with respect to the control of the axial pressing force applied to the axially movable driven pulley member 42 towards the axially fixed driven pulley member 38 as a function of the speed change ratio.

In FIG. 10, there is shown another possible construction for the speed change speed control device; this speed change ratio detecting valve is designated by the reference numeral 108b. In this embodiment, the parts of the control device which are not shown are the same as in the first preferred embodiment of FIGS. 1 to 3.

In this embodiment, the speed change speed control device 108b comprises a control valve 260, which comprises a valve element 263 which reciprocatingly slides in a bore formed in a housing, and first and second electromagnetic fluid control valves 256 and 258. The input sides of the electromagnetic valves 256 and 258 are supplied with the line pressure P1 from the conduit 74, and their output sides are connected via respective conduits 257 and 259 including throttling elements 257a and 259a to control chambers 262 and 264 respectively, said chambers 262 and 264 being defined at the bottom and the top end respectively in the figure of the bore of the control valve 260. A compression coil spring 261 biases the valve element 263 of the control valve 260 upwards in the figure in its bore. The line pressure P1 in the conduit 74 is also supplied via a conduit 265 to a port 268 of the control valve 260. When the valve element 263 of the control valve 260 is positioned in its upwards position in its bore, this port 268 is communicated to an output port 270 which leads to the pressure chamber 46 of the driving pulley assembly 17, and accordingly line pressure P1 is supplied to said pressure chamber 46; but on the other hand, when the valve element 263 is positioned in its downwards position in its bore, the output port 270 is communicated to a drain port 274, and accordingly said pressure chamber 46 of the driving pulley assembly 17 is communicated to drain. And, when the first electromagnetic valve 256 is energized, then it drains the conduit 257 via a drain 272 at the downstream of the throttling device 257a, so that no hydraulic pressure is supplied to the chamber 262. On the other hand, when the first electromagnetic valve 256 is not energized, then it blocks draining of the conduit 257, so that the line pressure P1 is supplied via said conduit 257 to said chamber 262. Similarly, when the second electromagnetic valve 258 is energized, then it drains the conduit 259 via a drain 266, so that no hydraulic pressure is supplied to the chamber 264. On the other hand, when the second electromagnetic valve 258 is not energized, it blocks the draining of the conduit 259, so that the line pressure P1 is supplied via said conduit 259 to said chamber 264.

Thus, the function of this speed change speed control device 108b is as follows. The first and second electromagnetic valves 256 and 258 are again selectively energized by an electrical control system (not shown) according to various operational parameters of the vehicle and of the continuously variable belt transmission device. When the first electromagnetic valve 256 is not energized, but the second electromagnetic valve 258 is energized, then the line pressure P1 is supplied to the pressure chamber 262 but not to the pressure chamber 264, and hence with the aid of the compression coil spring 261 the valve element 263 is positioned to its upwards position, and communicates the port 268 to the output port 270, thereby supplying the line pressure P1 to the pressure chamber 46 of the driving pulley assembly 17, and accordingly the speed change ratio provided by the continuously variable belt transmission device 16 falls. When the first electromagnetic valve 256 is energized, but on the other hand the second electromagnetic valve 258 is not energized, then the line pressure P1 is not supplied to the pressure chamber 262 but is supplied to the pressure chamber 264, and hence against the compression coil spring 261 the valve element 263 is positioned to its downwards position, and communicates the output port 270 to the drain port 274, thereby draining the hydraulic fluid in the pressure chamber 46 of the driving pulley assembly 17 at a fairly rapid rate, since the flow resistance of this fluid path is relatively low; and thus the speed change ratio of the continuously variable belt transmission device is increased at a relatively rapid rate. Accordingly, the same benefits and advantages are available, as were available in the case of the first preferred embodiment outlined above. In this embodiment, the conduit 121 that leads to the pressure chamber 194 of the cutoff valve 190 as shown in FIG. 2 is connected to the conduit 257 at the downstream of the first electromagnetic valve 256, and the conduit 125 that leads to the other pressure chamber 192 of said cutoff valve 190 is connected to the conduit 259 at the downstream of the second electromagnetic valve 258.

Although the present invention has been shown and described with reference to the preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown preferred embodiments, or of the drawings, but solely by the scope of the appended claims, which follow.

What is claimed is:

1. A control device for a continuously variable belt transmission device comprising a driving pulley assembly including an axially fixed pulley member and an axially movable pulley member, a driven pulley assembly including an axially fixed pulley member and an axially movable pulley member, an endless belt assembly which is fitted in a power transmitting manner around said driving pulley assembly and said driven pulley assembly in V-shaped grooves thereof to provide power transmission therebetween at a speed change ratio, and first and second pressure chambers for said driving and driven pulley assemblies respectively, each of said driving and driven pulley assemblies altering, according to supply of hydraulic fluid pressure thereto, the axial distance between said respective axially fixed and axially movable pulley members so as to alter the effective pulley radius of said respective one of said driving and driven pulley assemblies, said control device comprising:

a speed change speed control device which selectively either supplies, holds or drains an actuating fluid pressure to, in or from said first pressure chamber for said driving pulley assembly, said draining of said actuating fluid pressure from said first pressure chamber being selectively effected at at least two different rates;

a control pressure generating valve which generates a control pressure which decreases along with increase in said speed change ratio;

a line pressure generating valve, which receives supply of said control pressure from said control pressure generating valve, and which generates a line pressure and supplies said line pressure to said second pressure chamber for said driven pulley assembly, said line pressure decreasing along with increase in said control pressure generated by said control pressure generating valve;

a cutoff valve which, when, said speed change speed control device is draining said actuating fluid pressure from said first pressure chamber for said driving pulley assembly, at a higher rate of said at least two different rates prevents transmission of said control pressure from said control pressure generating valve to said line pressure generating valve; and means for providing fluid connection of said control pressure generating valve and said line pressure generating valve with said cutoff valve.

2. A control device for a continously variable belt transmission device according to claim 1, wherein said cutoff valve is an open and close valve which when closed blocks the transmission of said control pressure from said control pressure generating valve to said line pressure generating valve.

3. A control device for a continously variable belt transmission device according to claim 1, wherein said cutoff valve is an open and close valve which when opened intercepts the transmission of said control pressure from said control pressure generating valve to said line pressure generating valve by bypassingly draining said control pressure to a drain.

4. A control device for a continously variable belt transmission device according to claim 1, wherein said control pressure generating valve comprises a valve element which is provided with a driving force according to the amount of displacement of a movable member of said driving pulley assembly, the control pressure generating valve generating a control pressure which decreases along with increase in the distance between said axially movable pulley member and said axially fixed pulley member of said driven pulley assembly.

5. A control device for a continously variable belt transmission device according to claim 1, wherein said control pressure generating valve comprises a valve element which is provided with a driving force in one direction according to the pressure being supplied to said first pressure chamber for said driving pulley assembly and which is provided with a driving force in the other direction according to the pressure being supplied to said second pressure chamber for said driven pulley assembly, said control pressure generating valve generating a control pressure which is dependent upon the position of said valve element thereof.

6. A control device for a continously variable belt transmission device according to claim 1, wherein said speed change speed control device comprises a series combination of a first control valve shiftable between a first shift position thereof where it opens a passage for conducting said actuating fluid pressure from a source thereof toward said first pressure chamber for said driving pulley assembly while closing a passage for draining said first pressure chamber for said driving pulley assembly and a second shift position thereof where it closes said passage for conducting said actuating fluid pressure from said source thereof toward said first pressure chamber for said driving pulley assembly while opening said passage for draining said first pressure chamber for said driving pulley assembly, and a second control valve shiftable between a first shift position thereof where it opens a passage for conducting said actuating fluid pressure from said source thereof toward said first pressure chamber for said driving pulley assembly while opening a first drain passage for draining said first pressure chamber for said driving pulley assembly and a second shift position thereof where it closes said passage for conducting said actuating fluid pressure from said source thereof toward said first pressure chamber for said driving pulley assembly while closing said first drain passage and opening a second drain passage for draining said first pressure chamber for said driving pulley assembly, and the operation of said cutoff valve as to whether or not to prevent transmission of said control pressure from said control pressure generating valve to said line pressure generating valve is controlled according to combinations of the shifting of said first and second control valves of said speed change speed control device between the respective first and second shift positions thereof.

7. A control device for a continuously variable belt transmission device according to claim 6, wherein said first and second control valves are shifted between said respective first and second shift positions thereof according to supply or non-supply of respective control fluid pressures thereto, and said operation of said cutoff valve as to whether or not to prevent transmission of said control pressure from said control pressure generating valve to said line pressure generating valve is effected by said respective control fluid pressures for said first and second control valves of said speed change speed control device.

* * * * *